United States Patent
Yang et al.

(10) Patent No.: US 8,877,368 B2
(45) Date of Patent: Nov. 4, 2014

(54) THIN BATTERY

(71) Applicant: UER Technology Corporation, Miaoli County (TW)

(72) Inventors: Chung-Da Yang, Miaoli County (TW); Ray-Tang Sun, Miaoli County (TW)

(73) Assignee: UER Technology Corporation, Miaoli County (TW)

( * ) Notice: Subject to any disclaimer, the term of this patent is extended or adjusted under 35 U.S.C. 154(b) by 215 days.

(21) Appl. No.: 13/708,590

(22) Filed: Dec. 7, 2012

(65) Prior Publication Data

US 2014/0093749 A1 Apr. 3, 2014

(30) Foreign Application Priority Data

Oct. 3, 2012 (TW) .............................. 101219124 U (51) Int. Cl.
*H01M 2/04* (2006.01)
*H01M 2/02* (2006.01)
*H01M 2/06* (2006.01)

(52) U.S. Cl.
CPC .......... *H01M 2/0212* (2013.01); *H01M 2/0215* (2013.01); *H01M 2/0202* (2013.01); *H01M 2/0456* (2013.01); *H01M 2/0469* (2013.01); *H01M 2/06* (2013.01)
USPC ............................ 429/163; 429/138; 429/175

(58) Field of Classification Search
CPC ... H01M 2/06; H01M 2/0202; H01M 2/0215; H01M 2/0212

USPC .................................. 429/97, 151; 292/256.5
See application file for complete search history.

(56) References Cited

U.S. PATENT DOCUMENTS

| | | | |
|---|---|---|---|
| 2006/0270273 A1* | 11/2006 | Goetz et al. .................... | 439/557 |
| 2010/0266877 A1* | 10/2010 | Ebihara et al. ................... | 429/7 |
| 2011/0070466 A1* | 3/2011 | Park et al. ......................... | 429/7 |
| 2011/0097606 A1* | 4/2011 | Namura ............................ | 429/7 |
| 2013/0078501 A1* | 3/2013 | Yang et al. ..................... | 429/162 |
| 2013/0157084 A1* | 6/2013 | Bang et al. ......................... | 429/7 |

* cited by examiner

*Primary Examiner* — Ula C. Ruddock
*Assistant Examiner* — Scott J Chmielecki
(74) *Attorney, Agent, or Firm* — Muncy, Geissler, Olds & Lowe, P.C.

(57) ABSTRACT

A thin battery having an electric connector is provided. The electric connector can be used for plugging a mating connector along a first direction or a second direction. Therefore, when a mating connector is provided on mobile electronic equipment, the thin battery according to the present disclosure can be connected to the mobile electronic equipment along the first direction or second direction through the electric connector, thereby supplying power to it. Apart from the electric connector, the thin battery also includes a base plate, a first flange, a second flange, a third flange, a cover plate, at least two positioning blocks, a battery cell, and a circuit board. The cover plate can be bent toward the base plate and be clamped with the base plate. The electric connector is disposed between the base plate and a top sealing area, and is exposed from the opening.

10 Claims, 11 Drawing Sheets

THIN BATTERY

CROSS-REFERENCES TO RELATED APPLICATIONS

This non-provisional application claims priority under 35 U.S.C. §119(a) on Patent Application No. 101219124 filed in Taiwan, R.O.C. on 2012 Oct. 3, the entire contents of which are hereby incorporated by reference.

BACKGROUND

1. Technical Field

The present disclosure relates to a battery, and in particular, to a thin battery including an electric connector.

2. Related Art

In recent years, smart phones or tablet computers have been developing at a tremendous pace. Customers rush to buy new types of products as soon as the products are launched on the market. Smart phones and tablet computers deeply influence the daily life of the public, and even change consumers' social activities. For example, current smart phones and tablet computers on the market have 3G and WiFi functions. Through vigorous promotion by telecom carriers and consumer electronics providers, internet searching and web browsing at any time and any place have become an indispensable part of life for many people. This has changed the original internet access manner (limited to a room or some specific places), so that people obtain information more conveniently in real time.

The internet access capability and powerful multimedia play capability are a major attraction for consumers, but are not the only concern of consumers. Most consumers also require a mobile electric device to be light and thin, in addition to these advantages. To make an electronic device with functions almost the same as a personal computer whilst being light and thin, in addition to improvement in the integrated circuit (IC) technology, improvement of an energy density of the battery is also important. The energy density is the amount of energy that per unit volume or mass of a battery can provide. Therefore, if the volume and mass of the battery are reduced without reducing the battery capacity, the energy density of the battery can be effectively increased, which facilitates the application of the battery on portable electronic devices. Currently, lithium batteries are most widely used on portable electronic devices.

A lithium battery is connected to a circuit board through welding to reduce the size of the lithium battery, which makes rework impossible or difficult. Therefore, it is necessary to find an alternative solution.

SUMMARY

The present disclosure provides a thin battery, which includes a base plate, a first flange, a second flange, a third flange, a cover plate, at least two positioning blocks, a battery cell, a circuit board, and an electric connector.

The base plate has a first side, a second side, a third side, and a fourth side. The first side is opposite the third side, and the second side is opposite the fourth side. The first flange is connected to the first side and protrudes from a surface of the base plate. The second flange is connected to the second side, protrudes from the surface of the base plate, and includes a first clamp portion. The third flange is connected to the fourth side, protrudes from the surface of the base plate, and includes a second clamp portion.

The cover plate is connected to the third side in a bendable manner. Two ends of the cover plate respectively have a first clamp member and a second clamp member that are separately clamped at the first clamp portion of the second flange and the second clamp portion of the third flange. An opening is provided between the cover plate and the base plate.

The positioning block is disposed on a surface of the first flange. The battery cell includes a top sealing area. The top sealing area is provided with at least one via hole connected to the positioning block.

The circuit board is disposed between the top sealing area and the base plate, and is connected electrically to the battery cell. The electric connector is disposed between the base plate and the top sealing area, and is exposed from the opening. The electric connector is connected electrically to the circuit board. The battery cell outputs power through the electric connector, and is charged by power received through the electric connector.

In the present disclosure, the electric connector and the battery cell are integrated as a whole, so that the thin battery can be directly connected to electronic equipment provided with a mating connector through the electric connector. In addition, a body of the battery cell is not additionally covered by a case, therefore reducing an overall thickness. The present disclosure is further described in detail below through embodiments and accompanying drawings.

BRIEF DESCRIPTION OF THE DRAWINGS

The disclosure will become more fully understood from the detailed description given herein below for illustration only, and thus not limitative of the present invention, wherein.

DETAILED DESCRIPTION

Figure 1:
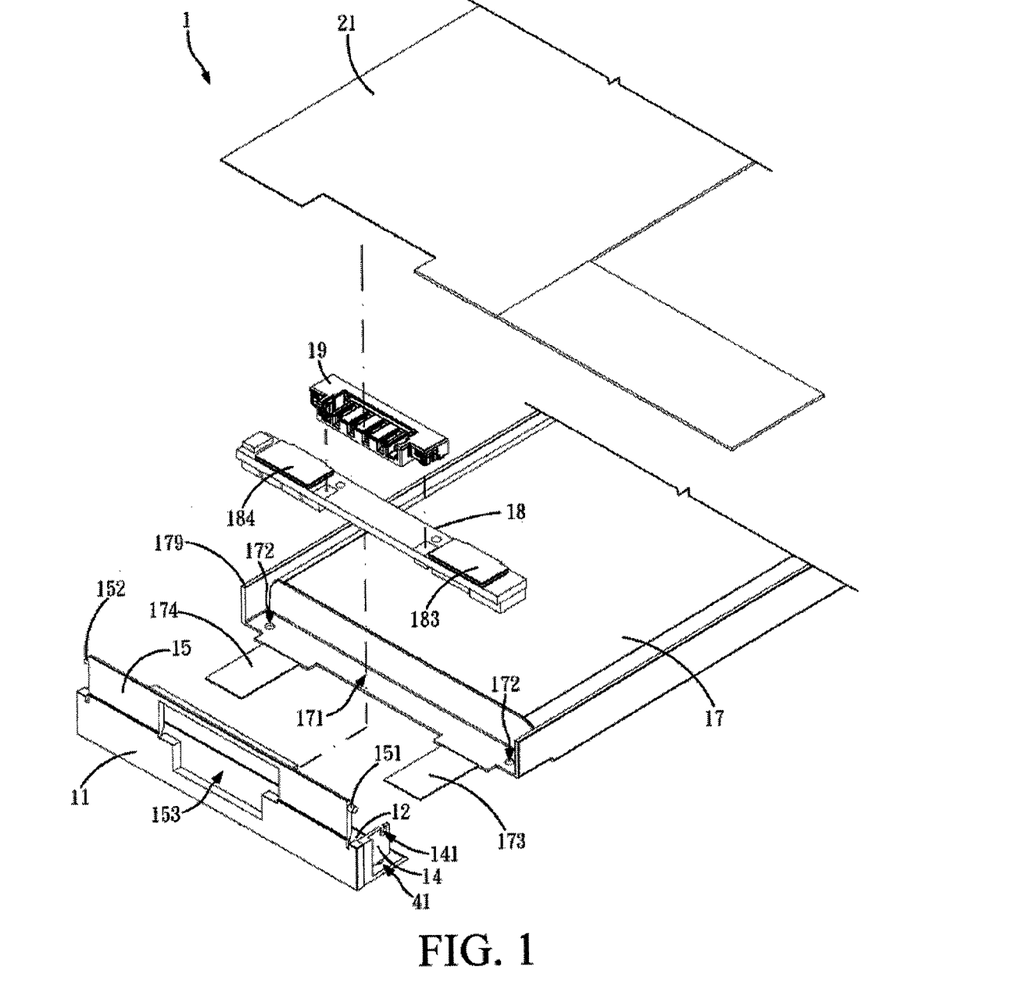
FIG. 1 is an exploded view of a first embodiment of the present disclosure.
Figure 2:
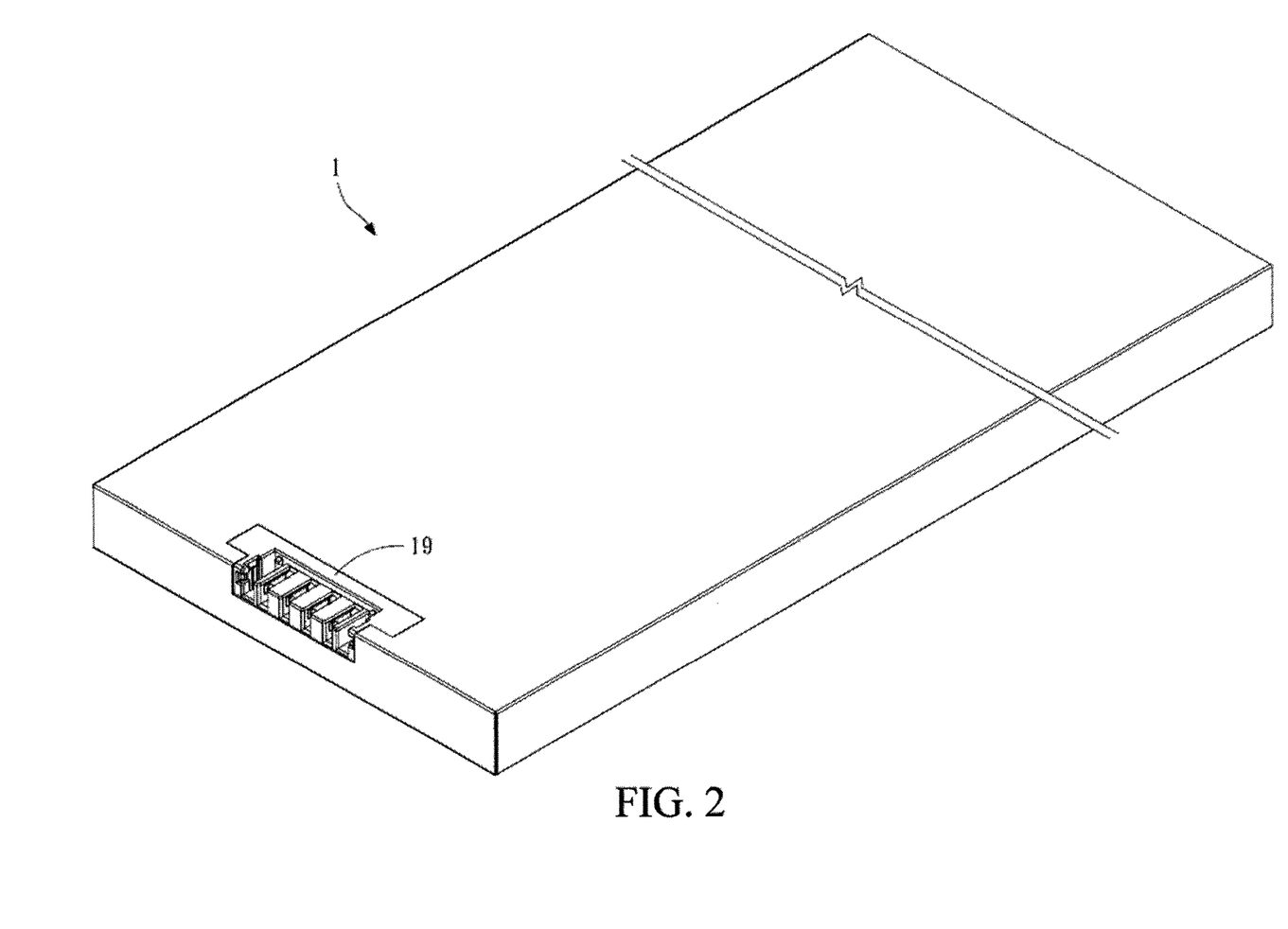
FIG. 2 is a three-dimensional view of a first embodiment of the present disclosure.

Please refer to FIG. 1 and FIG. 2, respectively an exploded view and a three-dimensional view of a first embodiment of the present disclosure, in which a thin battery 1 is disclosed. Please refer to FIG. 3 to FIG. 7, respectively a first schematic view to a fifth schematic view of a first embodiment of the present disclosure. The thin battery 1 includes a base plate 11, a first flange 12, a second flange 13, a third flange 14, a cover plate 15, at least two positioning blocks 16, a battery cell 17, a circuit board 18, and an electric connector 19.

The base plate 11 has a first side 111, a second side 112, a third side 113, and a fourth side 114. The first side 111 is opposite the third side 113, and the second side 112 is opposite the fourth side 114.

The first flange 12 is connected to the first side 111 and protrudes from a surface of the base plate 11. The second flange 13 is connected to the second side 112, protrudes from the surface of the base plate 11, and includes a first clamp portion 131. The third flange 14 is connected to the fourth side 114, protrudes from the surface of the base plate 11, and includes a second clamp portion 141. The third flange 14 is opposite the second flange 13.

The cover plate 15 is connected to the third side 113 in a bendable manner. Two ends of the cover plate 15 respectively have a first clamp member 151 and a second clamp member 152. After the cover plate 15 is bent toward the base plate 11, the first clamp member 151 and the second clamp member 152 are separately clamped at the first clamp portion 131 of the second flange 13 and the second clamp portion 141 of the third flange 14. In addition, an opening 153 is provided between the cover plate 15 and the base plate 11.

This embodiment includes two positioning blocks 16 disposed on a surface of the first flange 12. The battery cell 17 includes a top sealing area 171. The top sealing area 171 in this embodiment is provided with two via holes 172 respectively connected to the two positioning blocks 16, so that the battery cell 17 is fixed on the first flange 12. In another implementation manner, the positioning block is strip-shaped, and the via holes of the top sealing area 171 are also strip-shaped. After the via hole is connected to the positioning block, the battery cell 17 is fixed on the first flange 12.

The circuit board 18 is disposed between the top sealing area 171 and the base plate 11, and is connected electrically to the battery cell 17. The electric connector 19 is disposed between the top sealing area 171 and the base plate 11, and is exposed from the opening 152. The electric connector 19 is connected electrically to the circuit board 18. The battery cell 17 outputs power through the electric connector 19, and is charged by power received through the electric connector 19.

Figure 3:
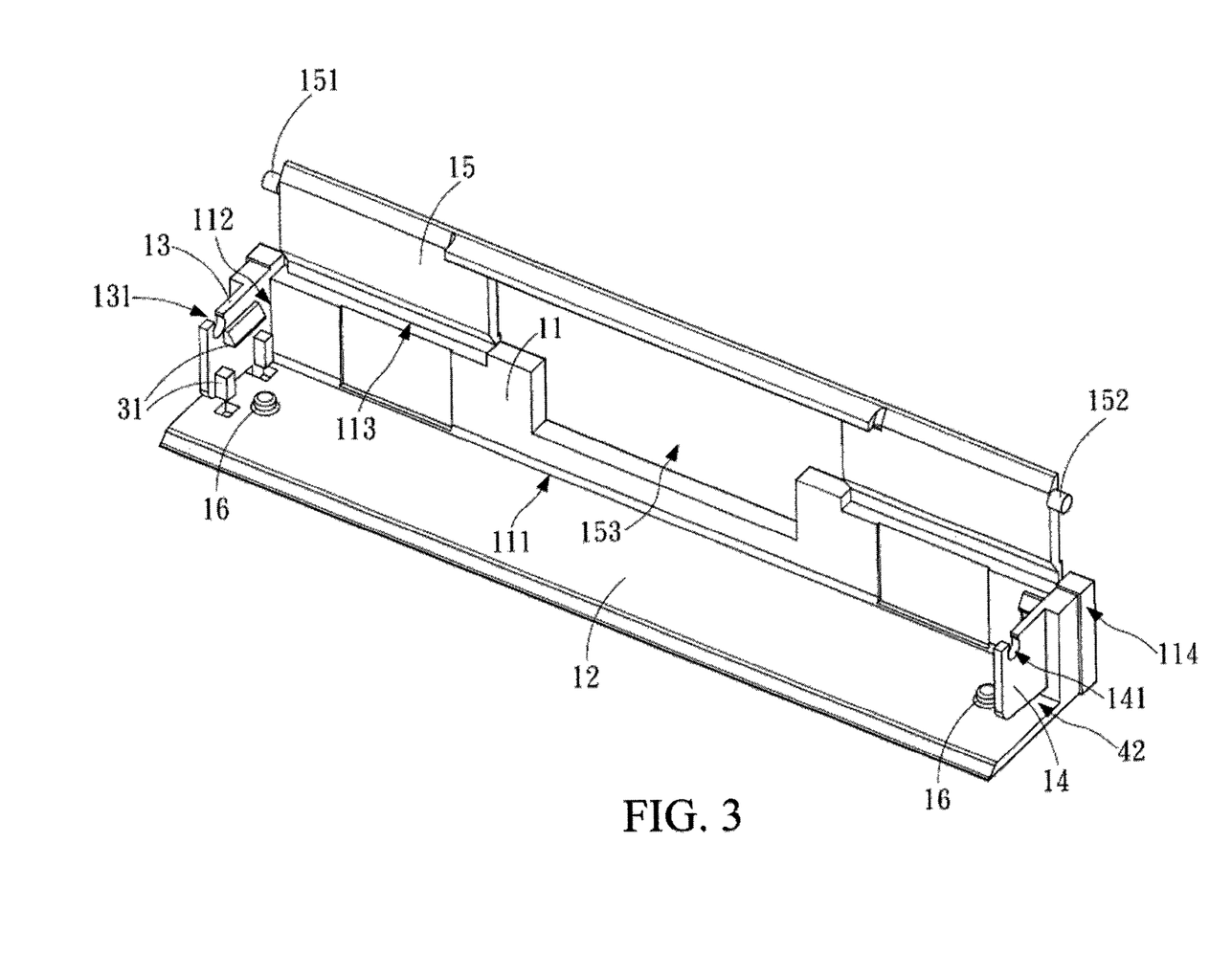
FIG. 3 is a first schematic view of a first embodiment of the present disclosure.
Figure 4:
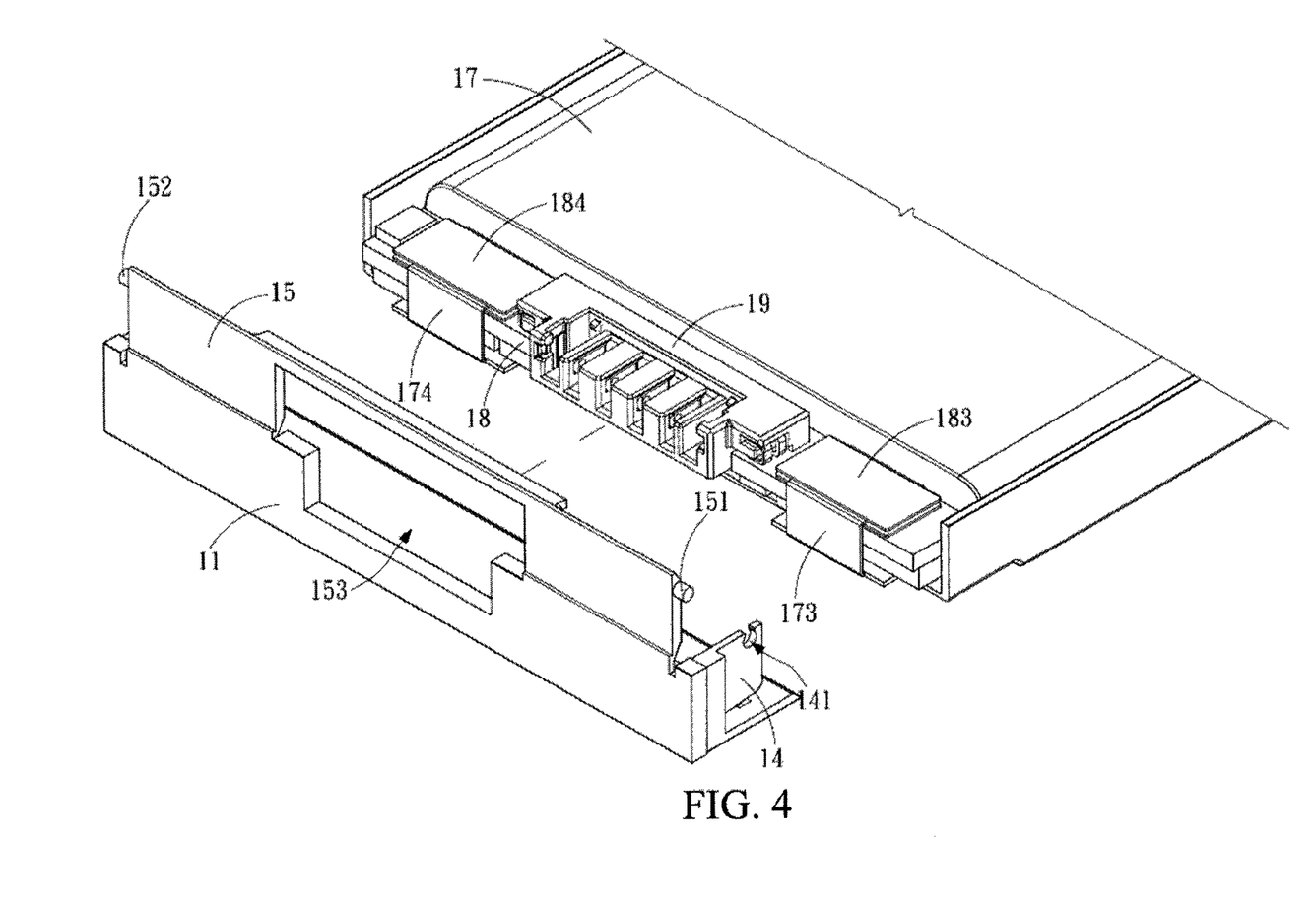
FIG. 4 is a second schematic view of a first embodiment of the present disclosure.

In an implementation manner, the second flange 13 further includes an abutting portion 31 that is disposed on a surface of the second flange 13 opposite the third flange 14. The third flange 14 further includes an abutting portion that is disposed on a surface of the third flange 14 opposite the second flange 13. In this implementation manner, two ends of the circuit board 18 are respectively abutted against the abutting portions of the second flange 13 and the third flange 14. As shown in FIG. 3, the abutting portion 31 of the second flange 13 includes at least two bumps protruding from the surface of the second flange 13; the abutting portion of the third flange 14 also includes at least two bumps protruding from the surface of the third flange 14. Two ends of the circuit board 18 are respectively abutted against the bumps on the surface of the second flange 13 and the bumps on the surface of the third flange 14.

Figure 5:
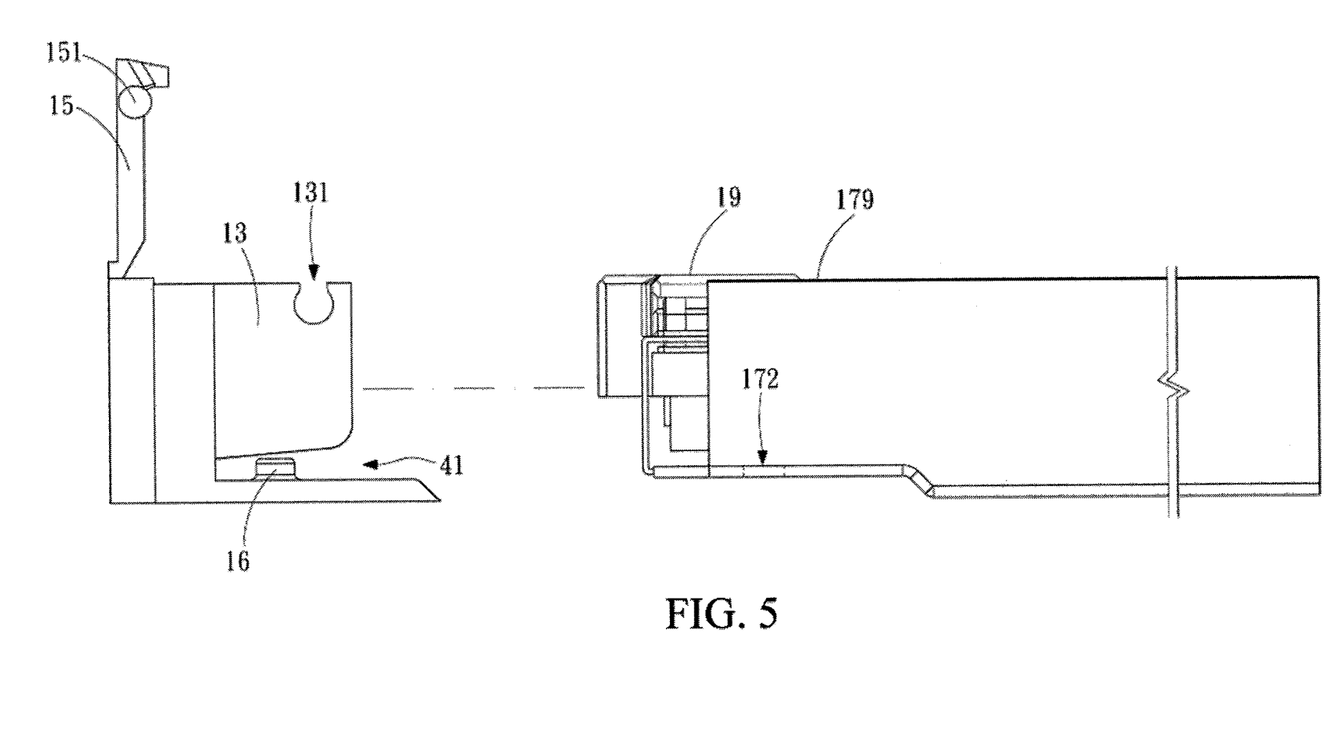
FIG. 5 is a third schematic view of a first embodiment of the present disclosure.
Figure 6:
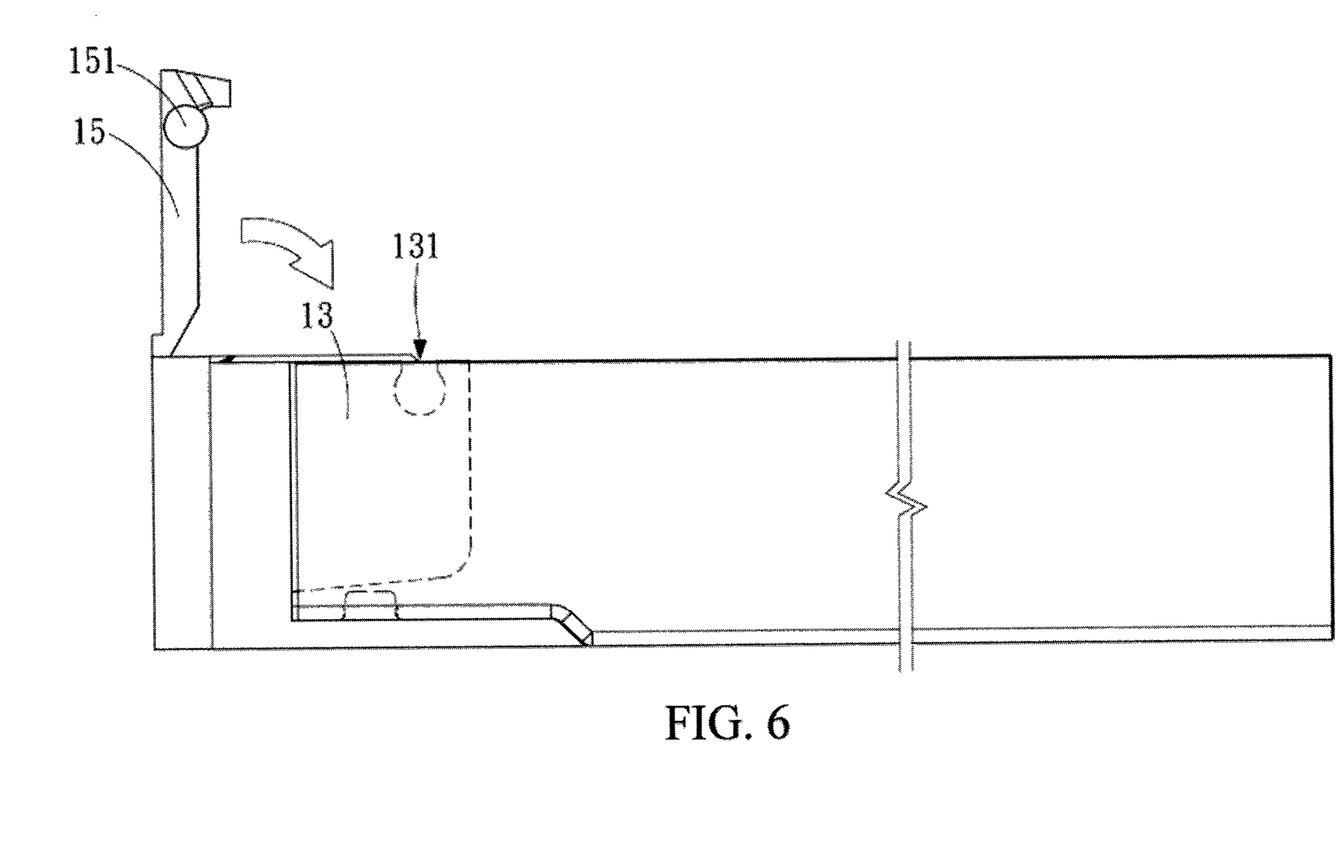
FIG. 6 is a fourth schematic view of a first embodiment of the present disclosure.
Figure 7:
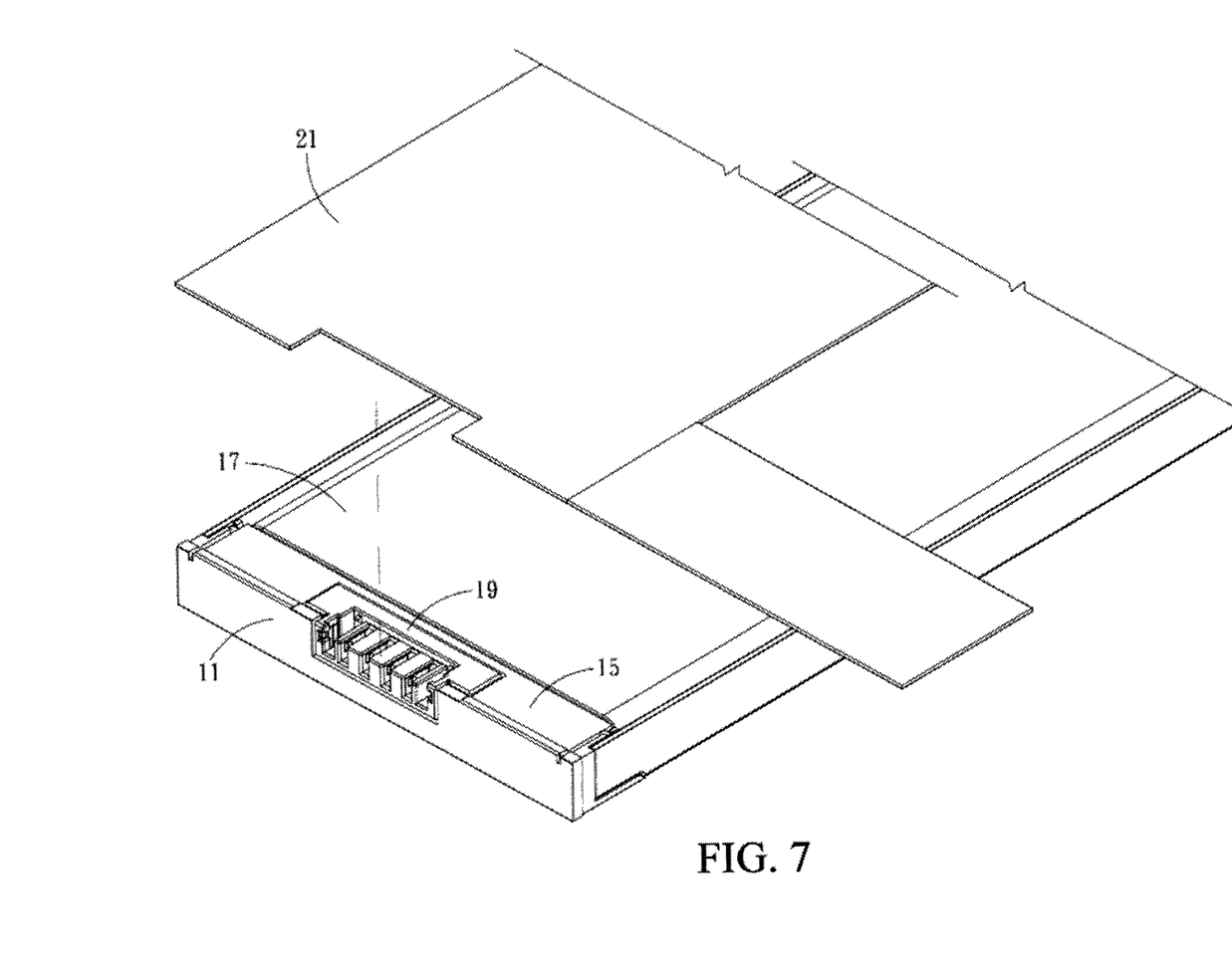
FIG. 7 is a fifth schematic view of a first embodiment of the present disclosure.
Figure 8:
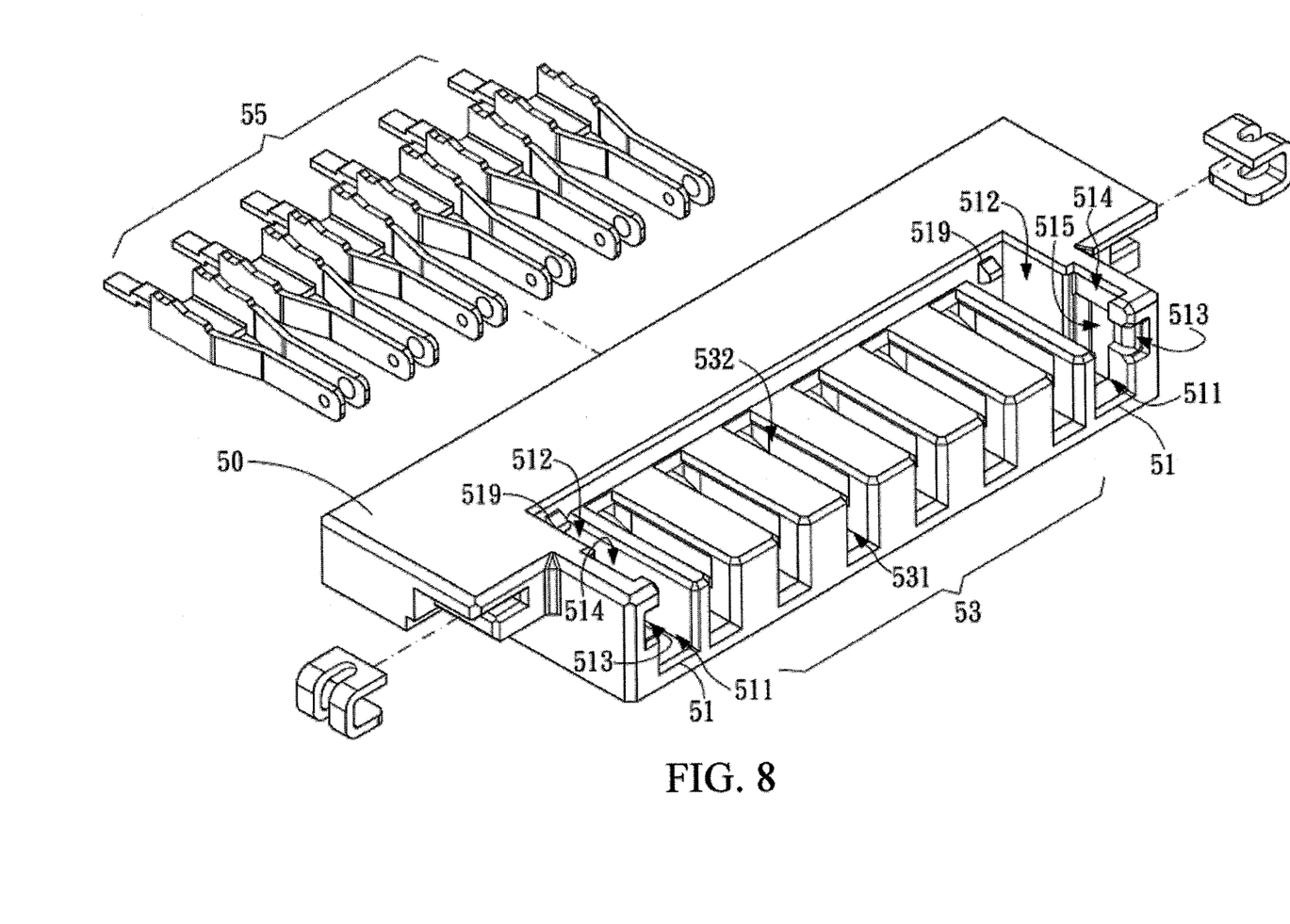
FIG. 8 is a first schematic view of an electric connector according to the present disclosure.
Figure 9:
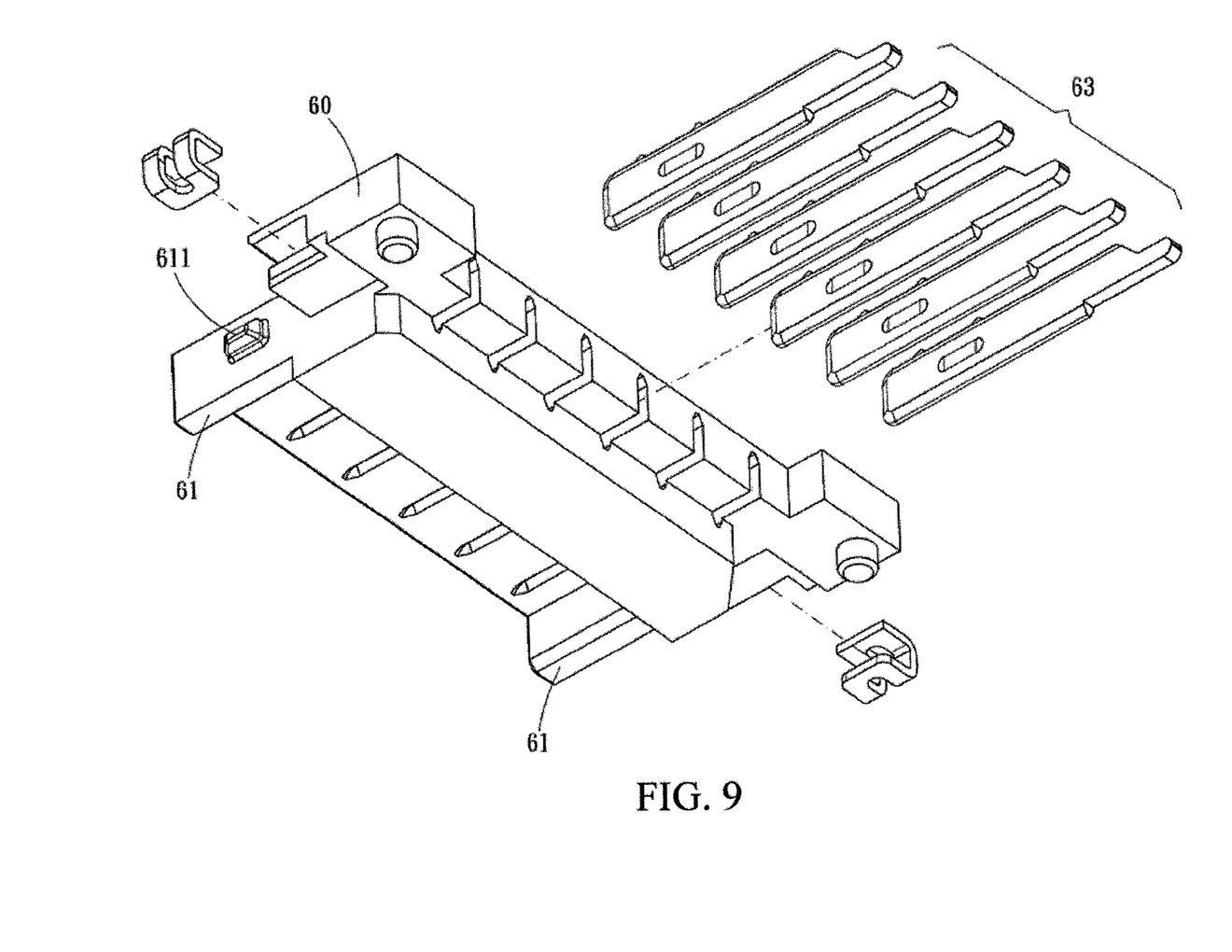
FIG. 9 is a second schematic view of an electric connector according to the present disclosure.

In an implementation manner, surfaces of the second flange 13 and the first flange 12 are spaced by a gap 41, as shown in FIG. 5. In addition, surfaces of the third flange 14 and the first flange 12 are spaced by a gap 42, as shown in FIG. 3. During manufacturing of the battery cell 17, a sealing side 179 is usually formed at an edge thereof, to insulate air and moisture from the outside. The sealing side 179 of the top sealing area 171 may be inserted to the gap 41 and the gap 42, and connects the via hole 172 to the positioning block 16. After the via hole 172 of the battery cell 17 is connected to the positioning block 16, the cover plate 15 is bent so that the first clamp member 151 and the second clamp member 152 are separately clamped at the first clamp portion 131 and the second clamp portion 141, and that the electric connector 17 is exposed from the opening 153. An outer surface is selectively wrapped by an adhesive tape 21, thereby completing the embodiment.

Further referring to FIG. 1, in an implementation manner, the circuit board 18 includes an anode welding pad 183 and a cathode welding pad 184. The battery cell 17 includes an anode handle 173 and a cathode handle 174. The anode handle 173 and the cathode handle 174 are connected electrically to the anode welding pad 183 and the cathode welding pad 184 respectively.

Please refer to FIG. 8 to FIG. 11, respectively a first schematic view of an electric connector, a second schematic view of an electric connector, a schematic view of plugging an electric connector along a first direction, and a schematic view of plugging an electric connector along a second direction according to the present disclosure. In an implementation manner, the electric connector 19 includes a first insulating body 50 and a plurality of conductive terminals 55. The first insulating body 50 includes two positioning slots 51 and a plurality of terminal slots 53. Each positioning slot 51 has a first socket 511 and a second socket 512. A first guide slot 513, a second guide slot 514, and a concave portion 515 are provided on a wall of each positioning slot 51. The first guide slot 513 extends from the first socket 511 to the concave portion 515 along a first direction 80. The second guide slot 514 extends from the second socket 512 to the concave portion 515 along a second direction 90. The terminal slots 53 are disposed between two positioning slots 51 at intervals. Each terminal slot 53 has a third socket 531 and a fourth socket 532. The plurality of conductive terminals 55 is separately disposed in the terminal slots 53.

Figure 10:
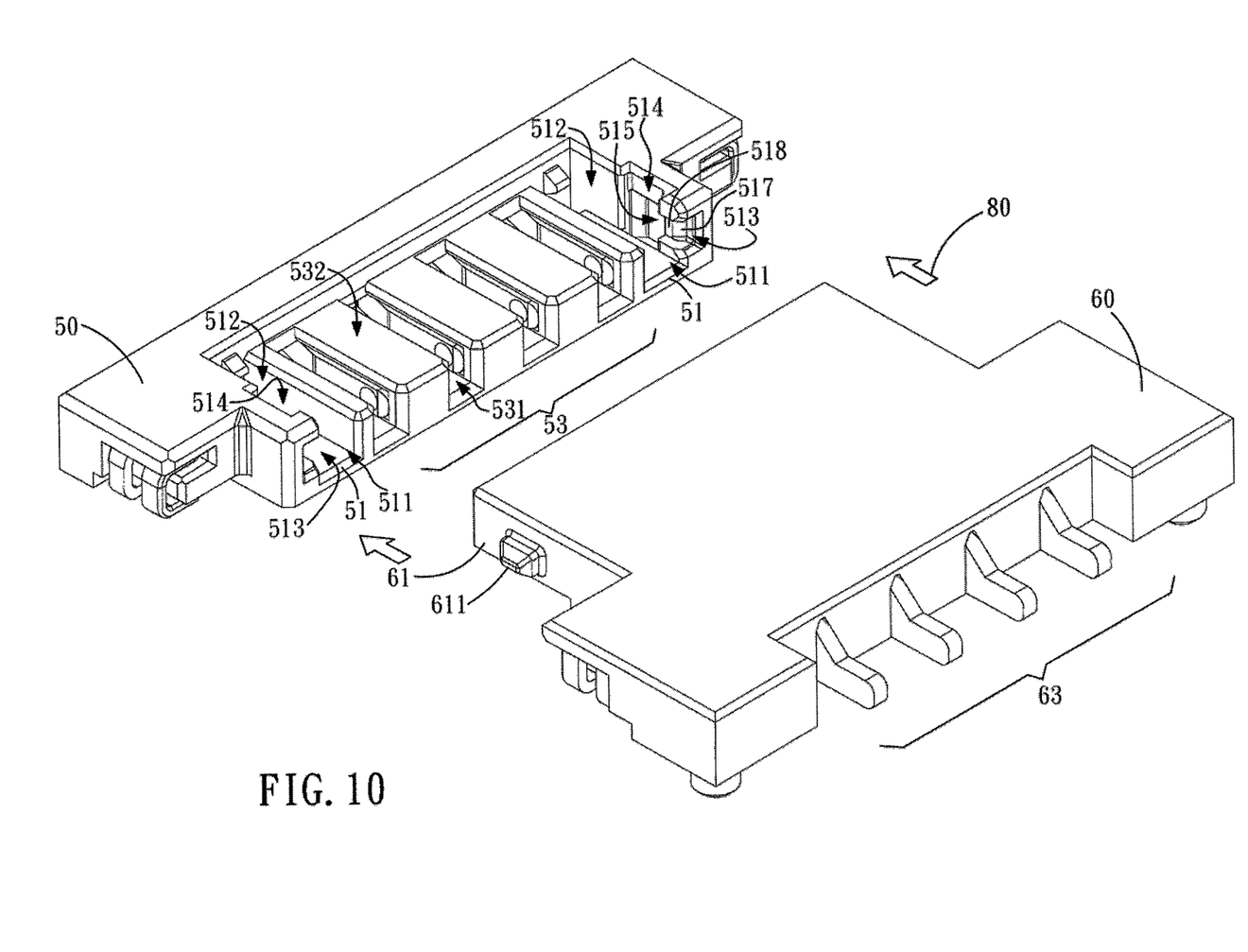
FIG. 10 is a schematic view of plugging an electric connector along a first direction according to the present disclosure.
Figure 11:
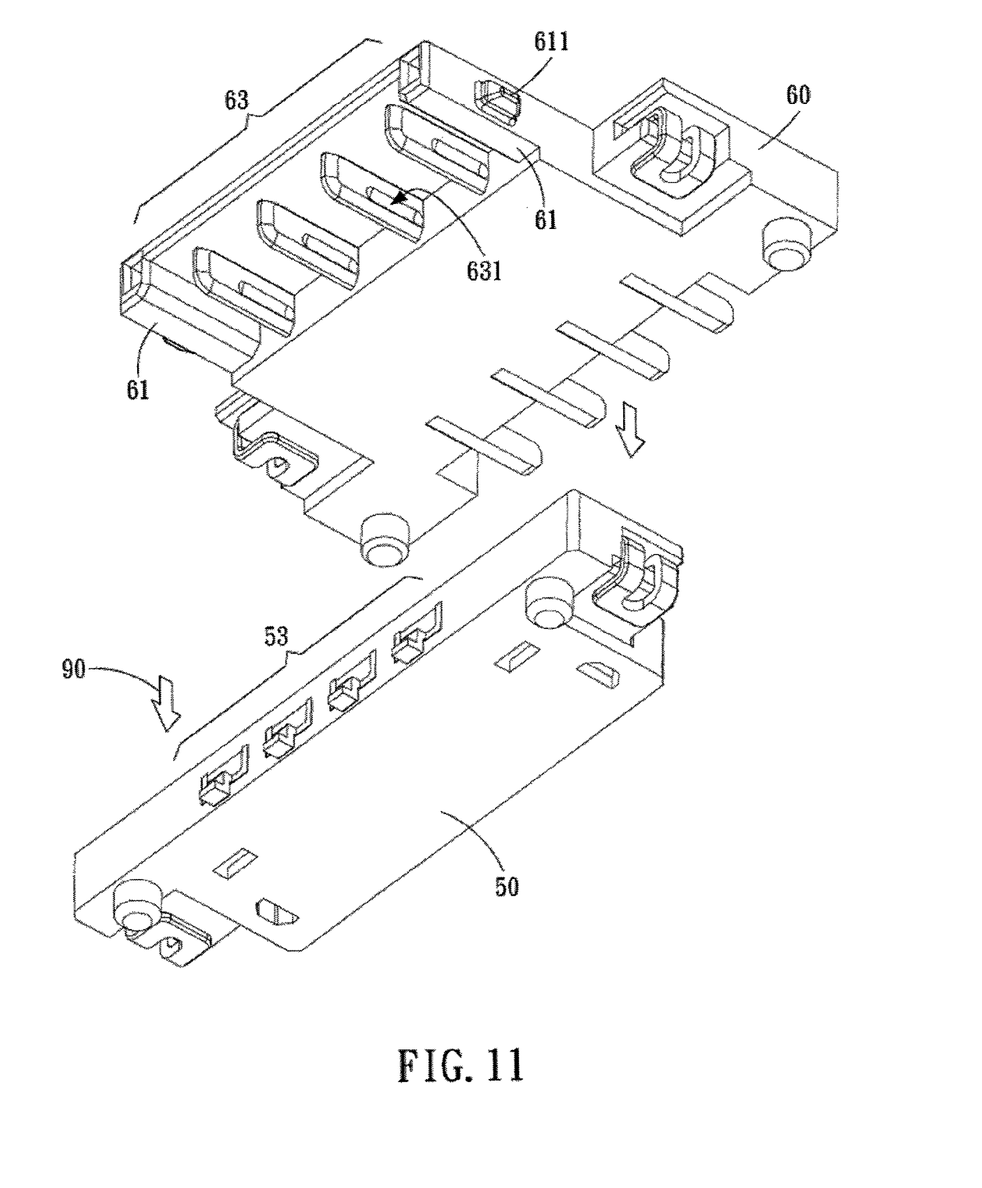
FIG. 11 is a schematic view of plugging an electric connector along a second direction according to the present disclosure.

In addition, the electric connector 19 further includes a second insulating body 60 and a plurality of metal pins 63. Two positioning plates 61 are disposed at two sides of the second insulating body 60, and are correspondingly connected to the two positioning slots 51. Each positioning plate 61 includes a positioning bump 611. The positioning bump 611 is embedded into the concave portion 515 from the first guide slot 511, or from the second guide slot 512 (as shown in FIG. 10), thereby fixing the second insulating body 60 on the first insulating body 50. The plurality of metal pins 63 is disposed between the two positioning plates 61 at intervals. When the positioning bump 611 is embedded into the concave portion 515, the plurality of metal pins 63 is separately inserted to the terminal slots 53 and is connected electrically to the conductive terminals 55.

Therefore, as long as the first insulating body 50 and the conductive terminals 55 are disposed on the top sealing area 171, and the second insulating body 60 and metal pins 63 are disposed on electronic equipment to be connected, the thin battery 1 can be connected to the electronic equipment from the first direction 80 or the second direction 90.

While the present invention has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A thin battery, comprising:
- a base plate, having a first side, a second side, a third side, and a fourth side, wherein the first side is opposite the third side, and the second side is opposite the fourth side;
- a first flange, connected to the first side and protruding from a surface of the base plate;
- a second flange, connected to the second side, protruding from the surface of the base plate, and comprising a first clamp portion;
- a third flange, connected to the fourth side, protruding from the surface of the base plate, and comprising a second clamp portion;
- a cover plate, connected to the third side in a bendable manner, wherein two ends of the cover plate respectively have a first clamp member and a second clamp member that are separately clamped at the first clamp portion and the second clamp portion; an opening is provided between the cover plate and the base plate;
- at least one positioning block, disposed on a surface of the first flange;
- a battery cell, comprising a top sealing area, wherein the top sealing area has at least one via hole that is correspondingly connected to the positioning block;
- a circuit board, disposed between the top sealing area and the base plate, and connected electrically to the battery cell; and
- an electric connector, disposed between the base plate and the top sealing area and exposed from the opening, wherein the electric connector is connected electrically to the circuit board, so as to supply power to the battery cell.

2. The thin battery according to claim 1, wherein the second flange further comprises an abutting portion disposed on a surface of the second flange opposite the third flange.

3. The thin battery according to claim 2, wherein the third flange further comprises an abutting portion disposed on a surface of the third flange opposite the second flange.

4. The thin battery according to claim 3, wherein two ends of the circuit board are respectively abutted against the abutting portion of the second flange and the abutting portion of the third flange.

5. The thin battery according to claim 1, wherein surfaces of the second flange and the first flange are spaced by a gap.

6. The thin battery according to claim 5, wherein surfaces of the third flange and the first flange are spaced by a gap.

7. The thin battery according to claim 1, wherein the circuit board further comprises an anode welding pad and a cathode welding pad.

8. The thin battery according to claim 7, wherein the battery cell comprises an anode handle and a cathode handle that are connected electrically to the anode welding pad and the cathode welding pad respectively.

9. The thin battery according to claim 1, wherein the electric connector comprises:
- a first insulating body, comprising two positioning slots and a plurality of terminal slots, wherein each positioning slot has a first socket and a second socket; a first guide slot, a second guide slot, and a concave portion are provided on a wall of each positioning slot; the first guide slot extends from the first socket to the concave portion along a first direction; the second guide slot extends from the second slot to the concave portion along a second direction; the terminal slots are arranged between the two positioning slots at intervals, and each terminal slot has a third socket and a fourth socket; and
- a plurality of conductive terminals, separately disposed in the terminal slots.

10. The thin battery according to claim 9, wherein the electric connector further comprises:
- a second insulating body, comprising two positioning plates correspondingly connected to the two positioning slots, wherein each positioning plate further comprises a positioning bump; the positioning bump is embedded into the concave portion through the first guide slot or the second guide slot, to fix the second insulating body on the first insulating body; and
- a plurality of metal pins, disposed between the two positioning plates at intervals, wherein when the positioning bump is embedded into the concave portion, the metal pins are separately inserted to the terminal slots and connected electrically to the conductive terminals.

* * * * *